United States Patent
Kettler

[11] Patent Number: 6,092,934
[45] Date of Patent: Jul. 25, 2000

[54] ASSEMBLY OF TWO OBJECTS ARTICULATED TO EACH OTHER WITH TWO DEGREES OF FREEDOM IN ROTATION

[75] Inventor: Daniel Germain Alexis Kettler, Chartrettes, France

[73] Assignee: Societe Nationale d'Etude et de Construction de Moteurs d'Aviation "SNECMA", Paris, France

[21] Appl. No.: 09/288,290

[22] Filed: Apr. 8, 1999

[30] Foreign Application Priority Data

Apr. 9, 1998 [FR] France ................................ 98 04422

[51] Int. Cl.[7] ................................................ F16C 25/04
[52] U.S. Cl. ........................................................ 384/212
[58] Field of Search ................................ 384/212, 211, 384/208, 213, 209

[56] References Cited

U.S. PATENT DOCUMENTS 2,475,393  7/1949  Keahey .
3,727,997  4/1973  Brucher et al. .
4,183,590  1/1980  Lower .

*Primary Examiner*—Lenard A. Footland
*Attorney, Agent, or Firm*—Oblon, Spivak, McClelland, Maier & Neustadt, P.C.

[57] ABSTRACT

Two objects are articulated together by a strong and compact joint which provides two rotational degrees of freedom about axes X and Y, and which comprises a bearing have a male inner ring swivel mounted in a female outer ring. The male inner ring is rotatably mounted on a shaft integral with one of the objects and defining the axis X, and the female outer ring is attached to the other object. The two rings are rotationally linked in the direction of an axis Z perpendicular to the X and Y axes by two flat support surfaces on the inner ring arranged between two flat guide surfaces in the outer ring, the said support surfaces and the said guide surfaces being parallel to the X and Z axes.

8 Claims, 4 Drawing Sheets

ASSEMBLY OF TWO OBJECTS ARTICULATED TO EACH OTHER WITH TWO DEGREES OF FREEDOM IN ROTATION

BACKGROUND OF THE INVENTION

1. Field of the Invention

The invention relates to the articulation of two objects A and B which are movable with respect to one other with two degrees of freedom in rotation, and more particularly to a compact and rapidly-assembled articulation exhibiting great strength.

For the sake of simplicity, reference will be made hereinafter to a system of orthogonal co-ordinates X, Y and Z, the respective roles of the co-ordinates obviously being able to be exchanged without affecting the invention and the sense of the description. Equally, a rotation said to be about X, Y or Z means that this rotation takes place about a geometric axis of rotation parallel to X, Y or Z, without prejudice to the exact position of this geometric axis of rotation.

Jacks, which may be hydraulic, pneumatic or electric, are frequently used in machines for moving two parts of the machine with respect to one another. One part, object A for example, may be the fixed structure of the machine, and the other part, object C for example, may be a movable element of the machine, the jacks constituting object B. In the case where the relative movement of the objects A and C is not pure translation, it is necessary to link the ends of the jack to the objects A and C by articulations exhibiting degrees of freedom in rotation which depend on this movement. Such an arrangement may also be necessary in order to remedy any imprecision in the relative positioning of the objects A and C.

2. Summary of the Prior Art

In the case where one of the objects A or C to be linked pivots with respect to the other about X for example, it is known to connect at least one end of the jack B to the corresponding object A or C by a simple articulation with only one degree of freedom in rotation about X, the said articulation comprising a cylindrical shaft in a bore oriented parallel to X. Because of errors in positioning along X between the objects A and C resulting from manufacturing tolerances, this solution has two drawbacks:

adjustment of the position of the jack along the shaft may be necessary in order to compensate for the errors in positioning resulting from the manufacturing tolerances; and it may be necessary to have sufficient play between the shaft and the bore to reduce the precision of the adjustment needed, or even to dispense with the adjustment.

However, such play in turn leads to several drawbacks:

the play reduces the precision of the relative movement of the objects A and C caused by the jack;

if it is substantial, the play frees the jack which can turn about itself under the effect of vibration; and the contact between the shaft and the bore is then maintained at only one end, which increases the contact pressures and can cause degradation of the shaft and of the bore at this end.

Because of this, it is known to connect the body of the jack to the fixed structure by means of a swivel, comprising a male part-spherical bearing surface usually attached to the body of the jack, and a female part-spherical bearing surface surrounding the male bearing surface with limited play and usually attached to the fixed structure. However, such an articulation exhibits several drawbacks.

1. The jack can turn about itself, for example under the effect of the vibration of the machine, which can generate stresses in the connections to the jack power source and cause the said connections to be destroyed. Consequently, supplementary anti-rotation means, that is to say means preventing this self rotation, have to be provided.

2. The swivel articulation has to be over-sized in order to withstand the force transmitted by the jack. This is particularly the case when the female part is assembled onto the male part by permanent deformation of the material of which it consists. This material therefore has to remain soft, and the swivel will not be able to withstand substantial forces without degradation of the part-spherical internal surface of the female part, this degradation being caused by the surface pressures which result therefrom. Moreover, this over-sizing has to be increased when the machines exhibit high levels of vibration. The over-sizing of the articulation itself entails an increase in its size and in its mass.

The problem arises particularly in aircraft jet engines in which objects such as the jet pipe flaps, discharge valves or stator vane control rings are actuated by jacks fastened to a fixed structure of large dimensions, the said jet engines being the seat of very high levels of vibration and stresses. These jacks are typically subjected to vibratory accelerations of 12G, i.e. 12 times the earth's gravity. Vital considerations of longevity lead to the articulations being sized to withstand up to 40G.

A swivel bearing is known from U.S. Pat. No. 4,183,590, in which the male part is a sphere comprising two external flats and a cylindrical bore, and the female part is in two parts and comprises a base plate interacting with a U-shaped yoke for entrapping the male part, the wings of the U interacting with the flats so as to guide the male sphere in a plane parallel to the said flats. Such a bearing provides two degrees of freedom in rotation, and is actually capable of withstanding substantial loads, but it exhibits the drawback of being bulky because of the screws necessary for connecting the two female parts together and to the bearing support.

SUMMARY OF THE INVENTION

It is an objection of the invention to articulate two objects A and B with two degrees of freedom in rotation in a manner which combines great robustness, particularly in a vibratory regime, and small size. Preferably the articulation will also be precise, that is to say with no play, and will be simple to produce and assemble.

To this end the invention provides an assembly of two objects articulated to one another with two degrees of freedom in rotation, said assembly comprising:

a first object A having a shaft defining a first geometric axis, said shaft having a circular cross-section along said geometric axis;

a second object B having a bore surrounding said shaft; and a bearing having a bearing axis disposed coaxially on said shaft of said first object and within said bore of said second object, said bearing comprising:

a female outer ring fitted in said bore of said second object and attached to said second object; and a male inner ring which is swivel mounted within said female outer ring and which is rotatably mounted and axially positioned on said shaft of said first object;

said inner ring having a circular bore which defines said bearing axis and through which said shaft of said first object extends, and a male part-spherical bearing surface provided with two flat support surfaces on diametrically opposite sides thereof, said two flat surfaces being parallel to eachother and to said bearing axis, and the distance between said two flat support surfaces being greater than the diameter of said circular bore and less than the diameter of the male part-spherical bearing surface;

said outer ring having a female part-spherical bearing surface in which said male part-spherical bearing surface swivels with limited clearance, and two flat guide surfaces which are parallel to each other and to said bearing axis and which are disposed with a limited clearance on opposite sides of said two flat support surfaces of said inner ring; and said circular bore, said male part-spherical bearing surface and said female part-spherical bearing surface exhibiting a generally axisymmetric shape along said bearing axis.

The inner ring is mounted on the shaft so that the inner ring can rotate on the shaft with limited clearance and without noticeable movement along the shaft. The term "limited clearance" is to be understood to mean the normal clearance necessary to allow the relative movement of the two surfaces in question without binding, having regard to the state of the surfaces and of the machining tolerances.

It will be understood that the inner ring cooperates with the shaft to create a freedom in rotation about X to the exclusion of any other freedom of movement. It will also be understood that the support surfaces on the inner ring cooperate with the guide surfaces of the outer ring to guide the said inner ring in a geometric plane parallel to the said surfaces, and thereby limit the relative mobility of the inner ring with respect to the outer ring to pivoting about a geometric axis Y perpendicular to the said support and guide surfaces, and thus perpendicular to X. Accordingly, the combination of the shaft, the inner ring and the outer ring of the bearing creates, between the objects A and B, an articulation with two degrees of freedom in rotation about X and Y to the exclusion of any other freedom of movement.

It will also be understood that the parts which are mutually moveable can react over substantial surface areas optimally occupying the space between the shaft of the object A and the bore of the object B, and with radii of curvature which are very close or infinite, i.e.: the inner ring with the shaft, the male part-spherical bearing surface with the female part-spherical bearing surface, and the support surfaces with the guide surfaces. The surface pressures are thus reduced, which reduces the degradation of the said surfaces under load, improves the strength of the articulation independently of the materials employed, and allows the bearing to withstand high stresses having regard to the materials employed.

Moreover, the support surfaces and the guide surfaces remain within the geometric sphere defined by the male and female part-spherical bearing surfaces. Hence, all the above-mentioned surfaces lie between the surface of the shaft and the geometric sphere defining the male and female part-spherical bearing surfaces. As a result, the invention provides a compact articulation between the objects A and B.

Preferably said outer ring comprises an axial aperture centered on said bearing axis and communicating said female part-spherical bearing surface with the outside of the bearing, said axial aperture having an internal profile along the bearing axis which is complementary to and larger than the external profile of the inner ring along said bearing axis, said axial aperture is placed facing said guide surfaces, and said guide surfaces are removable.

The term "profile along the bearing axis" should be understood to mean the profile of the orthogonal projection onto a plane perpendicular to the said bearing axis, for example on to the YZ plane.

It will be understood that this axial aperture constitutes a passage parallel to the bearing axis from the outside to the inside of the outer ring, which makes it possible to introduce the inner ring very simply into the outer ring by a translational movement parallel to the bearing axis. It will also be understood that the removable nature of the guide surfaces makes it possible to close off the said passage and thus to trap the inner ring in the outer ring.

Hence, the bearing is assembled very simply and very rapidly as follows:
  bring the inner ring into a position axially aligned with the outer ring and facing the axial aperture,
  insert the inner ring into the axial aperture until the male part-spherical bearing surface is inside the female part-spherical bearing surface, this insertion being effected by a simple translation al movement in the X direction,
  turn the inner ring by 90° about X,
  fit the guide surfaces.

The bearing is dismantled just as simply and rapidly by the reverse sequence of steps.

Preferably, the guide surfaces will be provided on keys inserted into grooves formed in the outer ring. This arrangement simplifies the machining of the guide surfaces and makes it possible to use hard materials, which allows the strength of the bearing to be enhanced despite its small size.

Preferably, the keys have outer faces on the opposite side from the guide surfaces, and said outer faces of the keys are substantially flush with the outer surface of the outer ring.

It will be understood that with such an arrangement, when the bearing is housed in the bore of the object B and the outer surface of the outer ring is in contact with the bore of the object B, the outer faces of the keys will also contact the inner surface of the said bore, which will prevent the keys from being able to escape from the grooves. This arrangement has the effect of automatically keeping the keys in position in the grooves when the bearing is housed in the bore of the object B.

Preferably, said second object B defines a second geometric axis along which said second object is capable of exerting a force on said first object A, said second geometric axis intersecting said first geometric axis, said male and female part-spherical bearing surfaces are centered on the point of intersection of said first and second geometric axes, and said guide surfaces of said outer ring are parallel to said second geometric axis.

The support surfaces divide the male part-spherical bearing surface of the inner ring into two sectors, and this arrangement has the effect of having the said sectors cut by the geometric axis of the object B so that the said sectors are axially symmetric with respect to the said geometric axis of the object B, at least in the vicinity of the said geometric axis of the object B. This arrangement is the best arrangement possible for allowing the male and female part-spherical bearing surfaces to react under the action of the force along the axis of the object B, since it minimizes the contact pressures. Moreover, the bore of the inner ring may bear on the shaft over an entire generatrix by virtue of the pivoting effect of the bearing, which allows the said bore of the inner ring and the said shaft to react in the best possible way to this force with minimal contact pressures. Hence, the articulation between the objects A and B is capable of withstanding high forces having regard to the materials employed and the small size of the bearing.

The object B may be an actuating rod, a link rod or a jack body, the geometric axis of which defines the axis along which the force is exerted. Such an object B has the function of transmitting or generating a force and has a generally longitudinal shape along its geometric axis and a reduced radial extent. The present invention is well suited to this since it provides a strong articulation of reduced size which does not protrude radially with respect to the said object B. In the case in which the object B is a jack body, the invention also exhibits the advantage of ensuring that the said jack body cannot rotate.

The bearing of an articulation in accordance with the invention has the advantage of allowing the combination of high strength with great simplicity of implementation. This is because:

- each component can be made from strong materials simply by using conventional machining means, such as turning, milling and grinding,
- the bearing can be assembled without crimping or permanent deformation of the components, which allows hard materials to be used, and
- more generally, the invention imposes no constraints on the choice of the materials and thus makes it possible, for each of the components, to choose materials which are compatible with each other and with the external components, in terms of frictional characteristics and of resistance to surface pressure.

DESCRIPTION OF THE PREFERRED EMBODIMENTS

Figure 1:
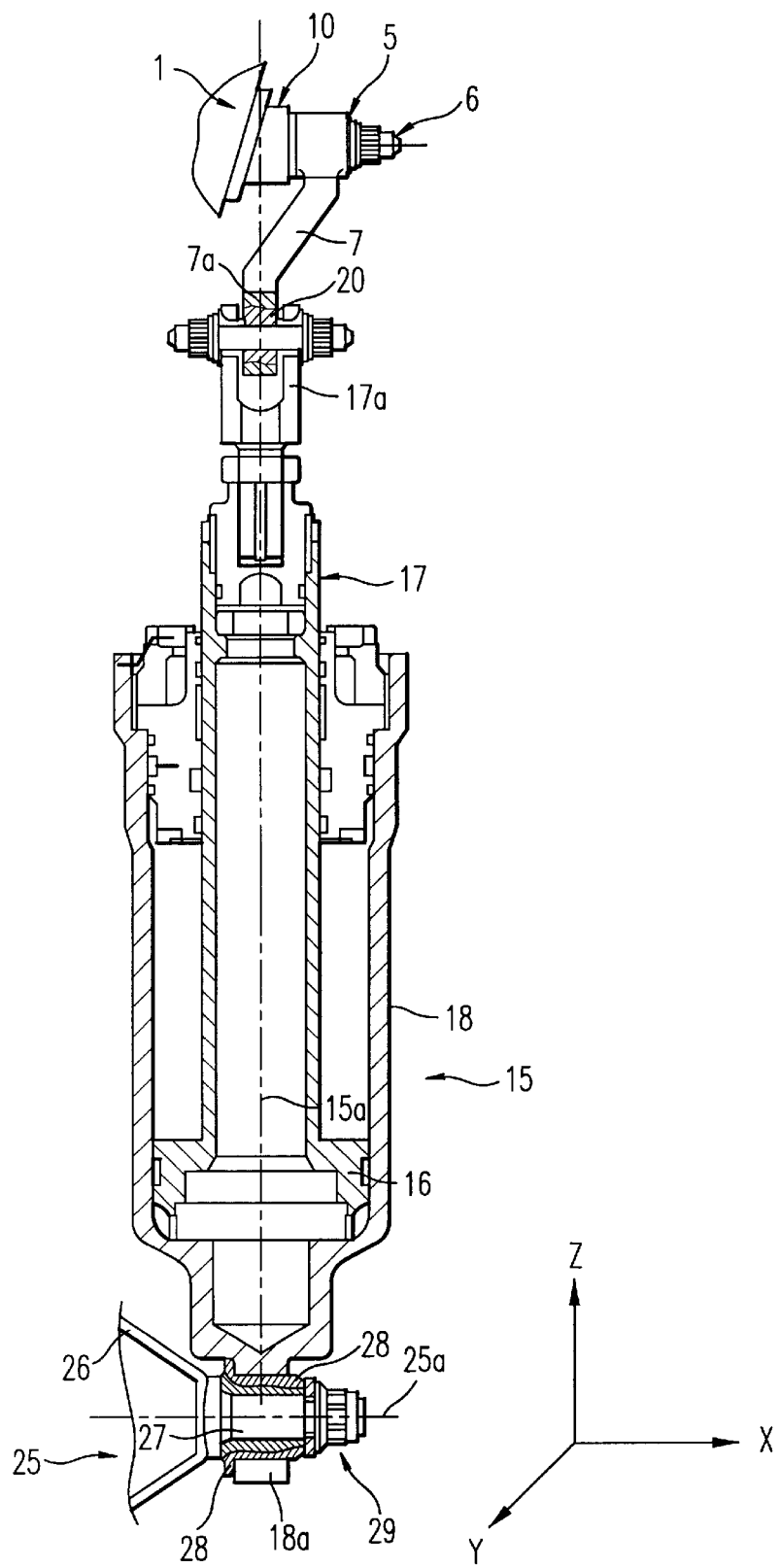
FIG. 1 is a longitudinal sectional view of a typical assembly of a jack in an aircraft jet engine for controlling, from the fixed structure of the engine, a movable object which pivots on the said fixed structure.

Referring firstly to FIG. 1, an articulated element 5, is pivoted by means of pivot shaft 6 integral with a crank 7 on the fixed structure 1 of an aircraft jet engine (not shown), the crank 7 making it possible to rotate the element 5. A spacer piece 10 is arranged around the pivot shaft 6 between the fixed structure 1 and the crank 7, so as to position the articulated element 5 on the shaft 6 with respect to the fixed structure 1. A hydraulic jack 15 has a generally elongate and axisymmetric shape along its geometric axis 15a, and produces a force acting along this geometric axis 15a. The jack comprises a piston 16 extended by a rod 17, the said piston 16 moving in the cylindrical body 18 of the jack 15. The end 17a of the rod 17 is linked to the end 7a of the crank 7 by a swivel joint 20. The end 18a of the body of the jack 15 is connected to the fixed structure 1 by connecting means 25 including, in succession along a geometric axis 25a parallel to the pivot shaft 6, a conical yoke 26, a shouldered shaft 27 and two shouldered bearing shells 28, which are held on the shaft 27 by means 29 constituted by a screw thread+washer+ nut, the end 18a of the body 18 of the jack being pivotally mounted on the bearing shells 28 and between the shoulders of the said bearing shells. It will be understood that the body of the jack 18 rotates on the bearing shells 28 which are themselves immobilized on the shaft 27 by tightening of the nut.

It will also be understood that the assembly of the fixed structure 1 + articulated element 5 + jack 15 is hyperstatic along the geometric axis 25a of the shaft 27, which leads to the end 18a of the body of the jack being mounted with an appropriate axial and radial play on the bearing shells 28 so as to allow sufficient inclination of the jack. This play can be reduced by an appropriate choice of the thickness of the spacer 10 at the time of fitting, but this complicates the fitting and extends the time it takes. In practice, a compromise is adopted between the play and the precision in the choice of the thickness of the spacer 10.

Figure 2:
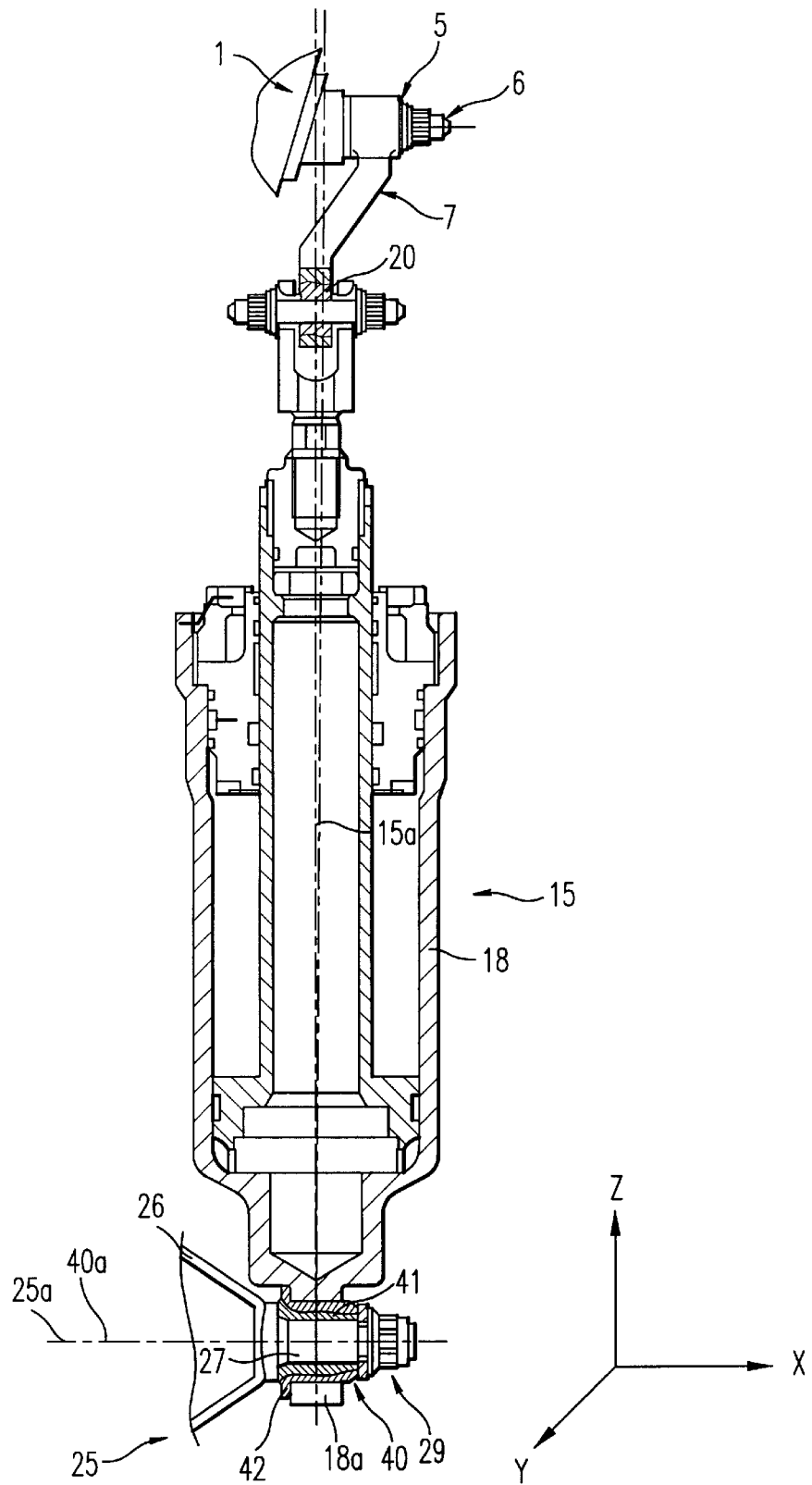
FIG. 2 is a view similar to FIG. 1 but showing an assembly in which the jack is articulated to the fixed structure in accordance with the invention.
Figure 3:
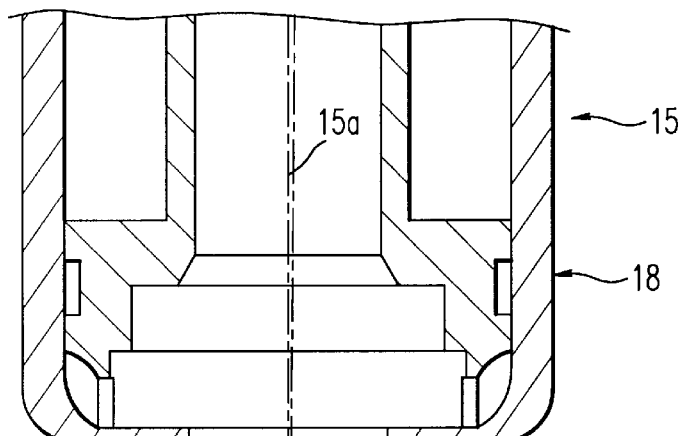
FIG. 3 is an enlarged sectional view of the articulation of the jack on the fixed structure.

For ease of description, reference will be made to a co-ordinate system with three orthogonal geometric axes X, Y and Z in which:

- the geometric axis X is parallel to the geometric axis 25a of the connecting means 25 and particularly of the shaft 27;
- the geometric axis Z is parallel to the geometric axis 15a of the jack 15;
- the geometric axis Y is perpendicular to the geometric axes X and Z, and thus perpendicular to the plane of FIGS. 1 to 3.

Referring now to FIG. 2, in accordance with one embodiment of the invention the end 18a of the body of the jack 15 is connected to the fixed structure 1 with two degrees of freedom in rotation about the X and Y axes by means of a bearing 40 having a geometric axis 40a, the said bearing 40 including an inner ring 41 arranged inside an outer ring 42. The inner ring 41 is rotatably mounted on the shaft 27, that is to say it can turn around the shaft 27 about the X axis, but has no freedom in translation along the X axis. The outer ring 42 is mounted in the end 18a of the body 18 of the jack 15. The rotational freedom about the Y axis resulting from the arrangement which is the subject of the invention makes it possible to dispense with the spacer referenced 10 in FIG. 1, and to simplify the fitting of the assembly. It will be understood that, when the bearing 40 is mounted on the shaft 27, their respective geometric axes 40a and 25a are coincident.

Figure 4:
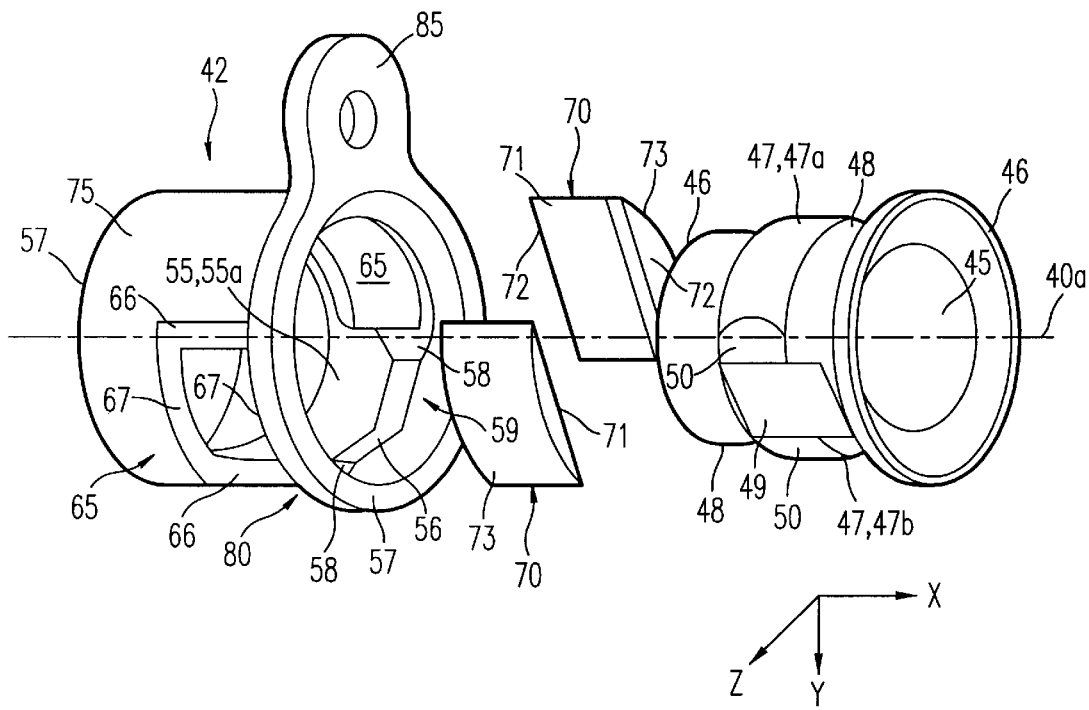
FIG. 4 is an exploded perspective view of one embodiment of the bearing used in the articulation in accordance with the invention.

Referring now simultaneously to FIGS. 3 and 4, the components of the retaining means 29 will be referenced 29a, 29b and 29c, i.e. respectively: the threaded end of the shaft 27, the washer and the nut. The inner ring 41 has a generally axisymmetric shape about the geometric axis 40a of the bearing 40. This inner ring 41 comprises an internal bore 45 centred on the axis 40a and opening at each end in a respective lateral surface 46 so as to allow the inner ring 41 to be rotatably mounted on the shaft 27 between the shoulder and the washer 29b. The inner ring 41 also comprises, on its outer periphery, a male part-spherical bearing surface 47 centered on the bearing axis 40a, and peripheral portions 48 extending on each side of the bearing surface 47 in the direction of the bearing axis 40a as far as the lateral faces 46. The male part-spherical bearing surface 47 therefore projects radially with respect to the said peripheral portions 48. The male part-spherical bearing surface 47 is cut away on two diametrically opposite sides thereof to form two flat, lateral support surfaces 49 which are parallel to the bearing axis 40a, parallel to each other, diametrally opposed with respect to the said bearing axis 40a, and are at a distance D from one another which is greater than the diameter of the bore 45 and less than the diameter of the part-spherical bearing surface 47. The support surfaces can simply be cut, for example by milling, into the male part-spherical bearing surface 47. It will be understood that the support surfaces 49 divide the male part-spherical bearing surface 47 into two diametrically opposed sectors 47a and 47b. Chamfers 50 may be cut at the intersections of the support surfaces 49 and the sectors 47a, 47b of the male part-spherical bearing surface 47 so as to simplify the machining of an axial aperture in the outer ring 42 described below.

The outer ring 42 has a generally axisymmetric shape along the bearing axis 40a, and comprises internally a female part-spherical bearing surface 55 which is centered on the bearing axis 40a and is arranged to accommodate the male part-spherical bearing surface 47 with limited clearance. The female part-spherical bearing surface 55 communicates on each side in the direction of the axis 40a with a bore 56 centered on the axis 40a and extending as far as the ends 57 of the said outer ring 42. At one end at least of the outer ring 42, the bore 56 is widened radially by two notches 58 extending from the end to the female part-spherical bearing surface 55. These notches 58, in conjunction with the bore 56, constitute an axial aperture 59 through which the inner ring 41 can be inserted into the outer ring 42 until the male part-spherical bearing surface 47 is inside the female part-spherical bearing surface 55. To this end, the profile of the axial aperture 59 projected in a plane perpendicular to the bearing axis 40a is at least as large as the corresponding profile of the inner ring 41. In order to mount the inner ring 41 in the outer ring 42, the inner ring 41 is first coaxially aligned with the outer ring and oriented so that the sectors 47a, 47b of the male part-spherical bearing surface 47 face the notches 58 in the bore 56 of the outer ring. The inner ring 41 is then inserted into the outer ring 42 by a translational movement along the bearing axis 40a until the male part-spherical bearing surface 47 is inside the female part-spherical bearing surface 55, and finally the inner ring 41 and the outer ring 42 are made to rotate 90° relative to one another about the bearing axis 40a so that the sectors 47a, 47b of the male part-spherical bearing surface 47 no longer face the notches 58. The inner ring 41 can then swivel normally in the outer ring 42 via the above-mentioned cooperating male and female part-spherical bearing surfaces.

This swivel movement is reduced, however, to a pivoting about a geometric axis Y perpendicular to the bearing axis 40a by the following arrangement. The outer ring 42 includes two straight grooves 65 which are cut in the outer periphery of the ring parallel to each other, perpendicular to the bearing axis 40a, and diametrically opposed with respect to the said bearing axis 40. The grooves 65 each have two side faces 67 and a flat bottom 66 which intersects the female part-spherical bearing surface 55. Two keys 70 are sized to fit snugly in the grooves 65, each key having a flat guide surface 71, two side faces 72 and a curved outer surface 73 remote from the flat guide surface 71. When the keys 70 are positioned in the grooves 65, the guide surfaces 71 face one another at a distance slightly greater than the distance D between the flat support surfaces 49 of the inner ring 41, and cooperate with the support surfaces to guide the inner ring with limited play in a plane parallel to the surfaces 49 and 71. It will be understood that the keys 70 carry out two functions: firstly they perform the abovementioned guidance and secondly they trap the inner ring in the outer ring. It will also be understood that when the bearing 40 is assembled, the inner ring 41 and the outer ring 42 retain only one degree of rotational freedom relative to eachother, that is about an axis Y perpendicular to the bearing axis 40a, to the support surfaces 49 and to the guide surfaces 71. Moreover, it will be understood that the amplitude of the rotational freedom about the Y axis is governed by the clearance left between the peripheral portions 48 of the inner ring 41 and the bore 56 of the outer ring 42.

The outer ring 42 also comprises an external surface 75 which allows it to be mounted in a bore 76 formed in the end 18a of the body 18 of the jack 15. Advantageously, when the keys 70 are in the grooves 65, the outer surfaces 73 of the keys 70 are flush with the external surface 75 of the outer ring 42. Hence, when the bearing 40 is inserted into the bore 76 of the jack 15, the keys 70 are automatically maintained in position and trapped in the grooves 65 by the bore 76.

Advantageously, the outer ring 42 also includes, at one end 57, a shoulder 80 enabling the outer ring 42 to be positioned axially against the body 18 of the jack. This shoulder 80 may be cut on at least one side to form a flat positioning surface 81 parallel to the bearing axis 40a, the said surface 81 allowing angular positioning of the outer ring 42 relative to the body of the jack in such a way that the support surfaces 49 and the guide surfaces 71 of the assembled bearing 40 are parallel to the geometric axis 15a of the jack.

Figure 5:
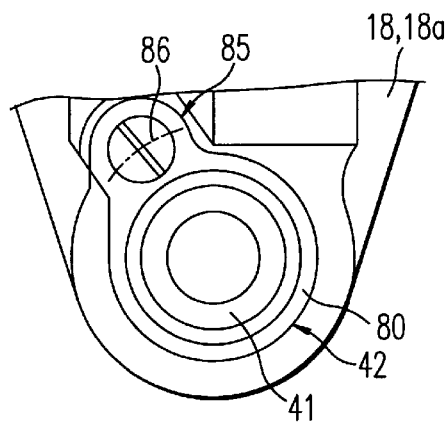
FIG. 5 is an external view illustrating the angular positioning of the bearing in an articulation according to the invention.

FIG. 5 shows another embodiment of the bearing in which the shoulder 80 is provided with a radial arm 85 instead of the flat positioning surface 81, the radial arm 85 being fastened, for example, by a screw 86, on the body of the jack in order to provide the required angular positioning of the outer ring 42 relative to the body of the jack.

Figure 6:
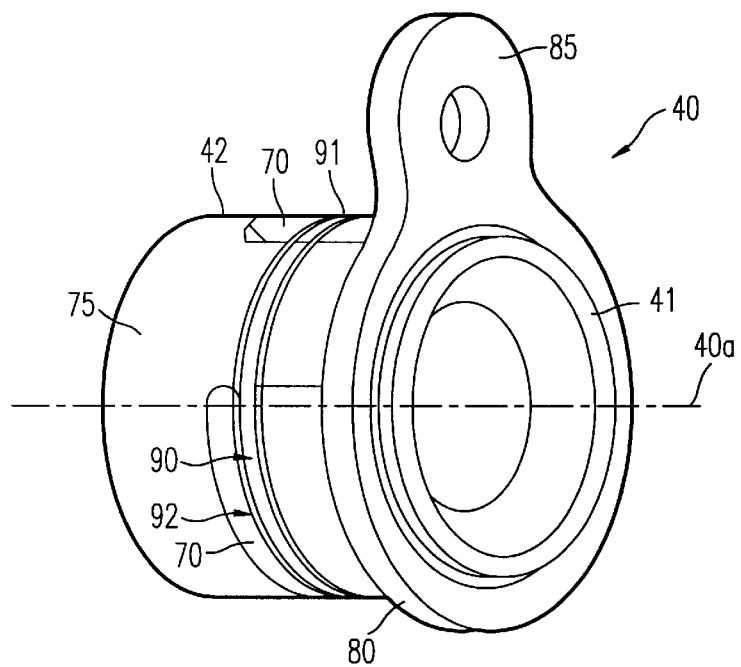
FIG. 6 is a perspective view of the assembled bearing shown in FIG. 4.

Referring now to FIG. 6, the keys 70 are shown held in position in the grooves 65 by a semi-circular spring clip 90, each end 91 of which penetrates radially through a hole into each key 70. This prevents the keys 70 falling out when the bearing 40 is not mounted in the jack. The spring clip 90 is arranged in a groove 92 of complementary shape to the said spring clip 90, the said groove 92 being formed partly in the outer surface 75 of the outer ring 42 and partly in the outer surfaces 73 of the keys 70, so that the bearing 40 can be mounted in the body of the jack without having to remove the spring clip 90.

As will be appreciated, the invention is not limited to the embodiments described above and is intended to cover all variants which may be applied to it without departing from the scope and spirit of the invention as defined hereinafter by the claims.

For example, the outer ring 42 may be produced in two parts, the guide surfaces 71 then being fashioned directly in the outer ring 42. This makes it possible to open the female part-spherical bearing surface 55 and to assemble the bearing 40 without having to remove the keys 70 beforehand, which keys can thus be dispensed with.

Also the grooves and keys may have straight side faces.

The strength of the articulation will be enhanced by lubricating the contacting surfaces, which increases the surface pressures at which degradation of the said surfaces occurs. For operation at high temperature, which is often the case in an aircraft jet engine, a solid lubricant can be used, such as molybdenum.

The outer ring 42 may be blind.

More generally, the articulation may be employed in the rod linkage gears currently used in mechanical engineering.

What is claimed is:

1. An assembly of two objects articulated to one another with two degrees of freedom in rotation, said assembly comprising:

a first object having a shaft defining a first geometric axis, said shaft having a circular cross-section along said geometric axis;

a second object having a bore surrounding said shaft; and a bearing having a bearing axis disposed coaxially on said shaft of said first object and within said bore of said second object, said bearing comprising:

a female outer ring fitted in said bore of said second object and attached to said second object; and a male inner ring which is swivel mounted within said female outer ring and which is rotatably mounted and axially positioned on said shaft of said first object;

said inner ring having a circular bore which defines said bearing axis and through which said shaft of said first object extends, and a male part-spherical bearing surface provided with two flat support surfaces on diametrically opposite sides thereof, said two flat surfaces being parallel to eachother and to said bearing axis, and the distance between said two flat support surfaces being greater than the diameter of said circular bore and less than the diameter of the male part-spherical bearing surface;

said outer ring having a female part-spherical bearing surface in which said male part-spherical bearing surface swivels with limited clearance, and two flat guide surfaces which are parallel to each other and to said bearing axis and which are disposed with a limited clearance on opposite sides of said two flat support surfaces of said inner ring; and said circular bore, said male part-spherical bearing surface and said female part-spherical bearing surface exhibiting a generally axisymmetric shape along said bearing axis.

2. The assembly as claimed in claim 1, wherein said outer ring comprises an axial aperture centered said bearing axis and communicating said female part-spherical bearing surface with the outside of the bearing, said axial aperture having an internal profile along the bearing axis which is complementary to and larger than the external profile of the inner ring along said bearing axis, and wherein said axial aperture is placed facing said guide surfaces, and said guide surfaces are removable.

3. The assembly as claimed in claim 2, wherein said guide surfaces are provided on keys inserted into grooves formed in said outer ring.

4. The assembly as claimed in claim 3, wherein said outer ring comprises an outer surface, and said keys have outer faces on the opposite side from said guide surfaces, said outer faces of said keys being substantially flush with said outer surface of said outer ring.

5. The assembly as claimed in claim 1, wherein said second object defines a second geometric axis along which said second object is capable of exerting a force on said first object, said second geometric axis intersecting said first geometric axis, and wherein said male and female part-spherical bearing surfaces are centered on the point of intersection of said first and second geometric axes, and said guide surfaces of said outer ring are parallel to said second geometric axis.

6. The assembly as claimed in claim 5, wherein said second object is an actuating rod defining said second geometric axis.

7. The assembly as claimed in claim 5, wherein said second object is a link rod defining said second geometric axis.

8. The assembly as claimed in claim 5, wherein said second object is a jack body defining said second geometric axis.

* * * * *